(12) United States Patent
Childs et al.

(10) Patent No.: US 6,470,683 B1
(45) Date of Patent: Oct. 29, 2002

(54) CONTROLLED DIRECT DRIVE ENGINE SYSTEM

(75) Inventors: Willard D. Childs, Encinitas; Ali Dabiri, San Diego, both of CA (US)

(73) Assignee: Science Applications International Corporation, San Diego, CA (US); by said Ali Dabiri ( * ) Notice: Subject to any disclaimer, the term of this patent is extended or adjusted under 35 U.S.C. 154(b) by 0 days.

(21) Appl. No.: 09/650,390

(22) Filed: Aug. 29, 2000

Related U.S. Application Data

(60) Provisional application No. 60/151,401, filed on Aug. 30, 1999.

(51) Int. Cl.[7] ................................................ B60K 16/00
(52) U.S. Cl. ........................................ 60/641.8; 60/39.6
(58) Field of Search .............................. 60/39.6, 641.8, 60/428

(56) References Cited

U.S. PATENT DOCUMENTS

| | | | |
|---|---|---|---|
| 4,145,884 A | | 3/1979 | Childs ........................ 60/486 |
| 4,333,424 A | * | 6/1982 | McFee ........................ 123/39 |
| 4,637,783 A | * | 1/1987 | Andeen ....................... 417/318 |
| 4,653,269 A | * | 3/1987 | Johnson ...................... 60/39.63 |
| 5,251,440 A | * | 10/1993 | Bong-dong et al. ...... 60/428 X |
| 6,017,200 A | | 1/2000 | Childs et al. ............... 417/404 |

OTHER PUBLICATIONS

Childs et al., "VARI–RO™ Direct Drive Engine Study, Final Technical Report", Desalination Research and Development Program Report No. 33, Sep. 1998, U.S. Department of the Interior, Bureau of Reclamation.

\* cited by examiner

Primary Examiner—Hoang Nguyen
(74) Attorney, Agent, or Firm—Fitch, Even Tabin & Flannery

(57) ABSTRACT

A controlled direct drive engine efficiency uses positive-displacement power produced from a thermal energy source (or sources), which may include combustion energy. Engine power production is from a plurality of cylinders appropriately controlled by a hydraulic drive unit to add to or subtract from such power output to adjust cyclic variations, thus producing a desired velocity profile for a piston (or other mover) in a fluid-displacement cylinder that is being used to effect pumping (or compressing) of liquids, gases, or vapors. The overall system is particularly suited to use a Modified Brayton thermodynamic cycle where the power output is delivered through a common rod to a positive displacement fluid pumping or compressing device. Interconnected with that common rod is a double-acting hydraulic cylinder which is operated in conjunction with a rotary, variable volume hydraulic motor/pump to effect the desired adjustment. By using a plurality of power outputs from such a Modified Brayton cycle (or other cycle), which outputs are phased to operate complementary to one another, power is transferred between individual power outputs to efficiently and smoothly operate a plurality of fluid-displacement devices.

20 Claims, 8 Drawing Sheets

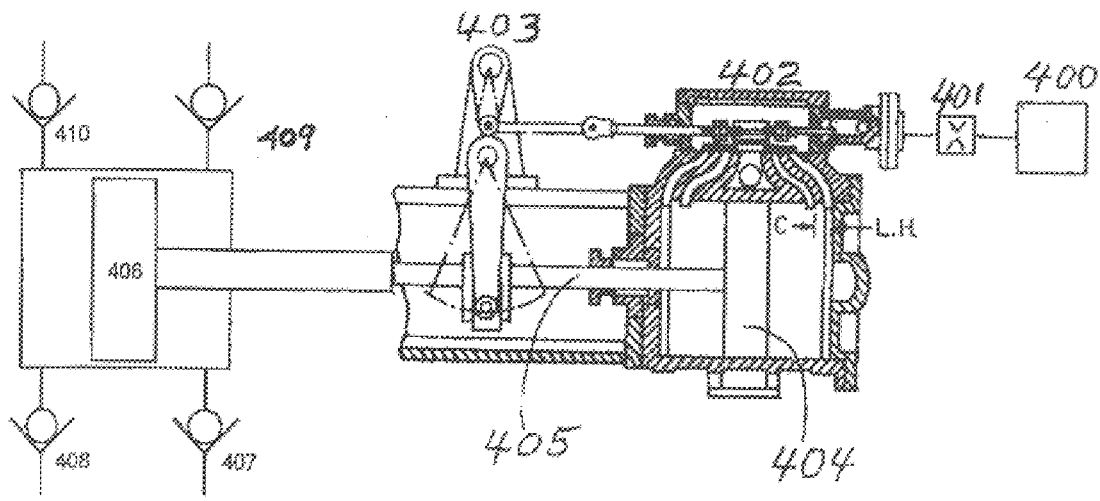
FIGURE 1 – Prior Art – Rankine Cycle Direct Acting Steam Pump
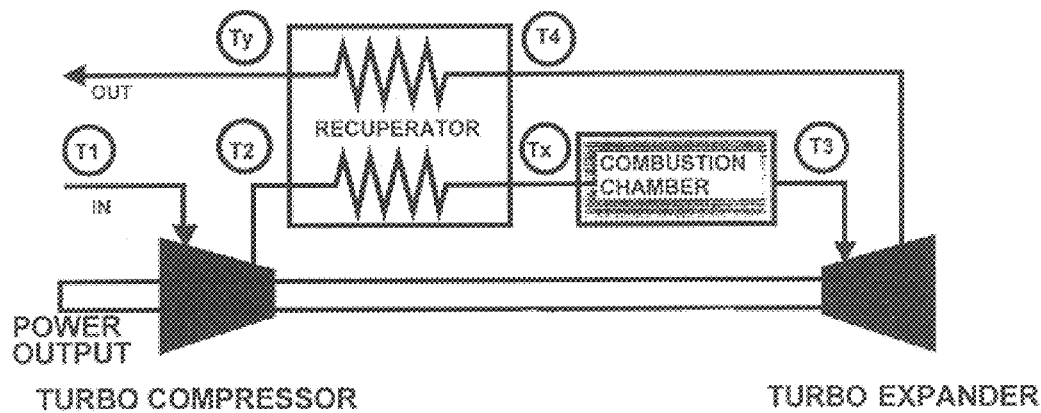
FIG. 2 – Prior Art
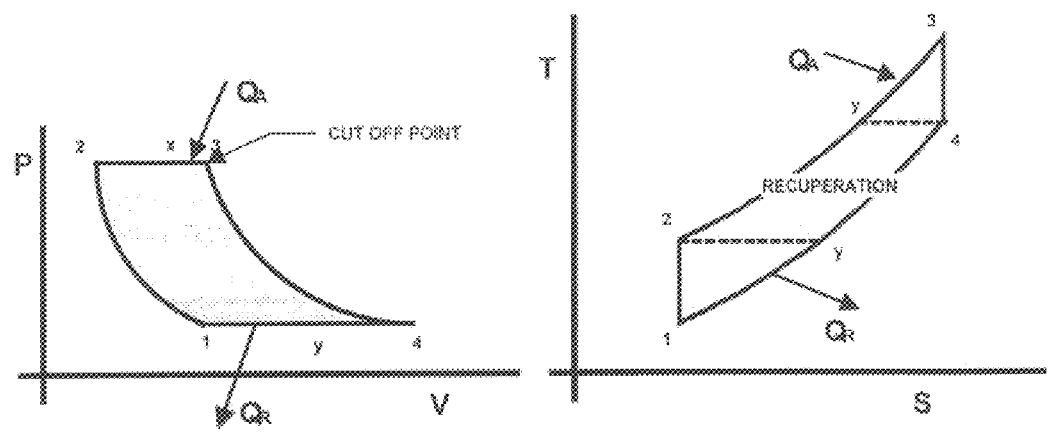
FIG. 3 – Prior Art

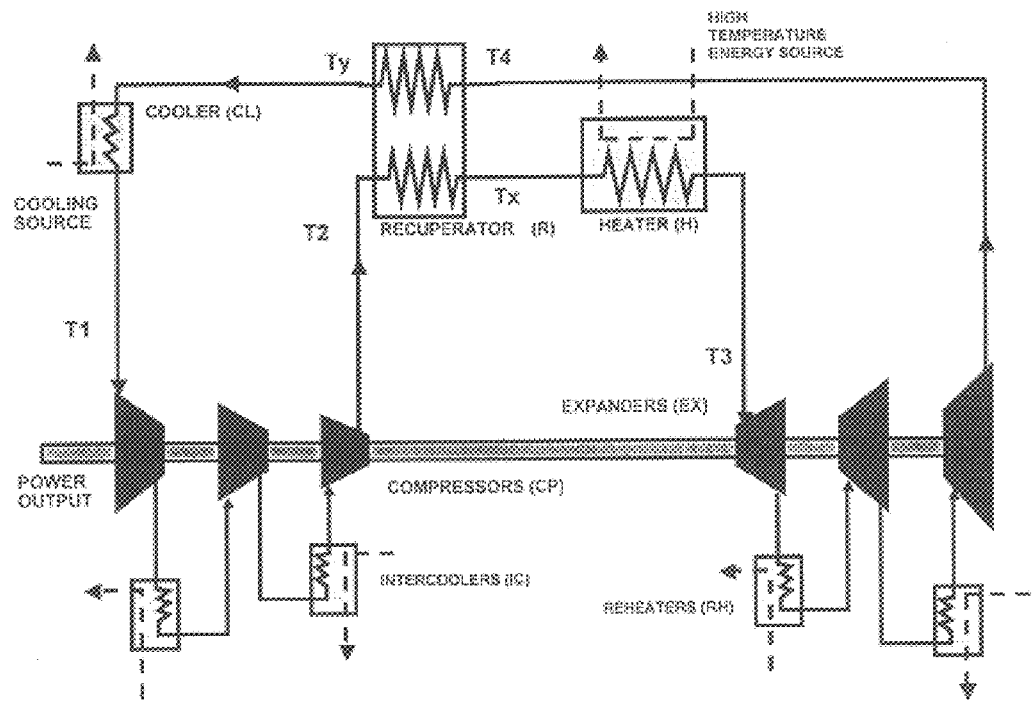
FIGURE 4 – Prior Art
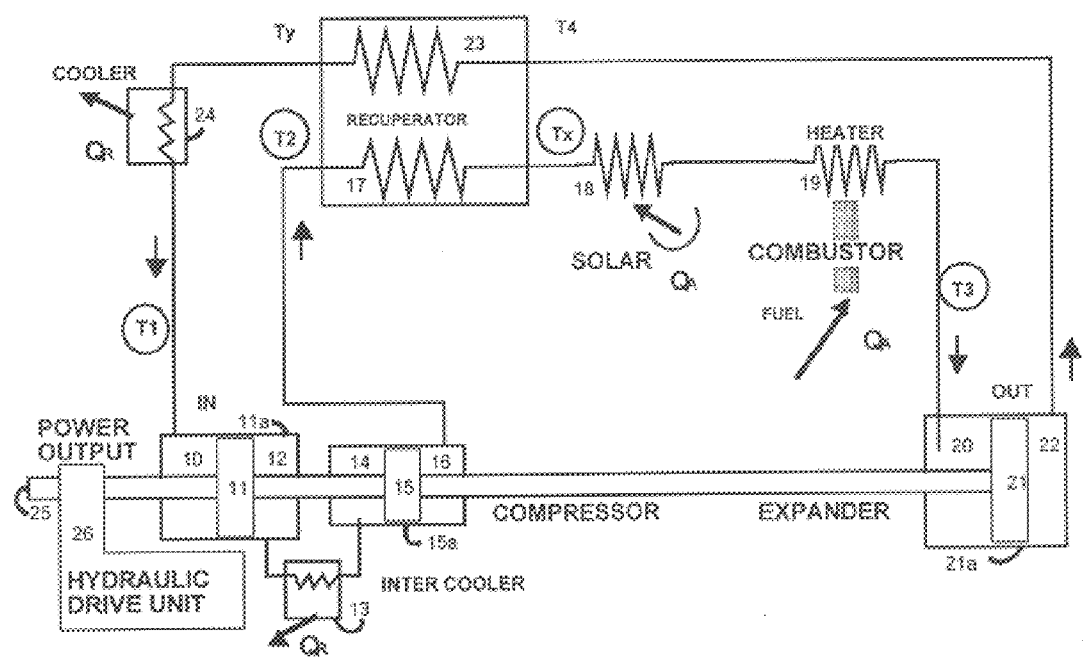
FIG. 5

CONTROLLED DIRECT DRIVE ENGINE SYSTEM

BACKGROUND OF THE INVENTION

This application claims priority from U.S. provisional application Ser. No. 60/151,401, filed Aug. 30, 1999. The disclosure of which is incorporated herein by reference.

This invention was partially developed with funds provided through Assistance Agreement No. 1425-97-FC-81-30006C provided b the Bureau of Reclamation, U.S. Department of the Interior. The Government may have some rights in this invention.

The present invention relates to a controlled direct drive engine system that can be-applied to pumps and compressors for moving a variety of fluids at high and low pressures and to methods for efficiently pumping fluids using a Modified Brayton cycle or the like power cycles.

Typically, such fluid-moving devices are driven by electric motors, gas turbines, steam turbines, direct-acting steam drive, or conventional Diesel or Otto cycle engines. These pumps and compressors can be of a variety of types, including: crank-driven piston or plunger, rotary screw, or centrifugal. It is generally accepted that the crank-driven pumps and compressors (positive displacement), when driven by conventional reciprocating engines, have the highest fuel-to-fluid efficiency presently available. However, these devices tend to have relatively high maintenance due to the high cycle speeds and pulsating flow—primarily as a result of the mechanical limitations of the crank, and conventional reciprocating engines have high emissions—primarily as a result of being internal combustion. It is also generally accepted that centrifugal pumps and compressors driven by electric motors are the most widely used, which is believed to be primarily due to their smooth output flow and convenience in installation. Moreover, these centrifugal fluid-moving devices are often used even though they inherently have lower fuel-to-fluid efficiency than competing devices and even though the device must be carefully matched to the flow and pressure conditions in the system. Accordingly, solutions have been sought that would overcome these limitations and provide smooth variable flow, low cycle speeds, high fuel-to-fluid efficiency, low emissions, and the capability to efficiently match nearly any flow or pressure condition, up to the ratings of the equipment.

It is known in the art that, when a gas at high temperature and pressure is applied to a piston, the resulting force and velocity can impart energy to another piston to pump a liquid or compress a gas. One version of such a fluid-moving device is known as the direct-acting steam pump, using the Rankine thermodynamic cycle, see FIG. 1, which is shown in the Standard Handbook for Mechanical Engineers, Seventh Edition, Page 14–9. There are simplex (single piston assemblies) and duplex (double piston assemblies) versions of these pumps. However, these types of fluid-moving devices have low fuel-to-fluid efficiency, which results from the inability to expand the steam to fairly low pressures and temperatures in order to thus recover more available thermodynamic energy in the steam. This latent energy in the steam is lost when the driving cylinders are vented for the return stroke. Also, because of the thermodynamic characteristic of steam, or other vaporizing liquid that might be used in the Rankine cycle, the pressure ratio from the inlet conditions to the discharge conditions is quite large. This provides another inherent limitation of the direct-acting steam pump.

Furthermore, the direct-acting steam pump has an additional limitation because it normally operates in a "bang-bang" uncontrolled velocity mode. In this bang-bang mode, steam is admitted at the start of the stroke and causes the piston to travel at full velocity until it reaches the end of the stroke—hence the term bang-bang. The inlet pressure of the energy source fluid (steam), and the resistance pressure exerted by the fluid being moved, determines the piston velocity. In addition, the piston velocity that can be achieved may often be limited by pressure drops in the pipes and valves, or it may often be necessary to throttle the steam or the fluid being moved —with such a pressure drop resulting in energy losses. Moreover, these losses will occur even if multiple pistons are actuated in sequence, such as in the case of a duplex configuration.

It should be apparent that what is needed is a controlled direct drive engine system to power pumps and compressors that accomplishes the functions provided by the previously mentioned devices and methods, yet overcomes the shortcomings. It is an object of the present invention to overcome these shortcomings and assure more efficient operation in systems of this type as well as addressing other needs.

In seeking to overcome these shortcomings, it was felt that modern high performance hydraulic power transmission, electronic control, and other techniques that would replace bulky cranks, gearing and housings normally associated with positive displacement energy conversion equipment might aid in finding solutions. The variable displacement capability (and high power density) of hydraulic power was felt to allow the energy conversion process to be optimized in ways that are not usually feasible with conventional positive displacement or rotodynamic energy conversion techniques, and it was felt that this capability could result in a significant improvement in energy utilization effectiveness in addition to improved efficiency. Thus, it was felt that modern hydraulic hydrostatic transmission (HST) technology should be closely examined in this respect.

Conventional hydrostatic transmission equipment includes the variable displacement, over-center, hydraulic hydrostatic pump (HSP) which includes a tiltable swash plate and which may be used to drive a fixed displacement hydraulic hydrostatic motor (HSM). Hydrostatic transmissions of this general type have gained use as variable speed transmissions replacing conventional gear transmissions. Modern agriculture equipment, such as combines and tractors, commonly use these as continuously variable transmissions. The reasons for such use include high power density and the ability to control machine speed precisely with single lever control, while maintaining efficient engine speed. The swash plate angle position of a variable displacement pump can be controlled by a variety of mechanisms, ranging from a simple manual lever control to a sophisticated electronic servo control.

It should be noted that the hydrostatic pump is a reversible device and can also function as a hydraulic motor, when pressure is applied to the ports from another source. This inherent capability further adds to the versatility of the invention, and provides capability for a variety of energy conversion purposes.

Hydrostatic transmission components are presently manufactured in sizes from 5 to 3000 horsepower. One unique characteristic of such a positive displacement hydrostatic transmission component (pump or motor) is that its best-efficiency-point (bep) is quite high over a wide range of sizes (88% to 94%), and its efficiency remains quite high over a wide range of speed, pressure, and power. By comparison, rotodynamic devices (e.g. centrifugal pumps and turbines) have only one bep; their efficiency and system effectiveness can thus dramatically decrease in comparison.

SUMMARY OF THE INVENTION

The present invention accomplishes the functions achieved by the above-mentioned prior art in a unique way, and in a preferred mode thereof, three primary energy transfer functions are accomplished. Energy is first transferred from an energy source fluid using positive displacement. A second energy transfer is then made to a piston that is driving a fluid that is being moved while a hydraulic power device controls the power being transferred to the fluid being moved. Finally, a third transfer of energy is preferably made between piston assemblies that are operating in a complementary fashion through the controlled power device. The controlled power device controls the piston velocity profile, which includes timing sequence, acceleration, velocity, deceleration, stroke distance, and dwell of the stroking pistons, in a prescribed manner. In addition, there is preferably a transfer of energy from a piston assembly having excess available power from its source to another piston assembly that may momentarily have insufficient power from its source. This energy transfer by the controlled power device allows a piston assembly having insufficient source power to still complete its stroke in accordance with its prescribed piston velocity profile while making use of what might be termed excess power that is available.

With the foregoing in mind, the present invention is directed to a controlled direct drive engine system for pumps and compressors for moving a variety of fluids at high or low pressures. Such fluids might include water, petroleum products, slurries, high viscosity fluids, natural gas, compressed air, or substantially any other liquid or gaseous fluid. Because the system is a positive displacement system, it is particularly well suited for applications where the pressure can vary over a wide range. In addition, the invention is well suited for applications where slow cycle speeds are desirable to increase the life of the component parts and reduce maintenance costs. Moreover, the engine is well suited for applications where low atmospheric emissions are important, including the reduction of emissions, such as nitrogen oxides ($NO_x$), carbon monoxide, carbon dioxide, and other pollutants. Furthermore, it is well suited for applications where high fuel-to-fluid efficiency is particularly important in order to achieve the economical movement of fluids, and examples of such applications include the transportation of natural gas through pipelines and the movement of water for crop irrigation. Other applications where high fuel-to-fluid efficiency can be important are those associated with power generation from renewable and low intensity energy sources, such as solar energy or geothermal energy.

In accordance with one aspect of the invention, a controlled direct drive engine system is provided for solar-powered desalting of seawater using the reverse osmosis process. It should be understood that, although such a controlled direct drive engine system for reverse-osmosis applications includes certain aspects of the invention, the invention is not limited to such an application as it may be applied to a variety of other applications, including those heretofore mentioned. In general, this invention utilizes modern hydraulic power transmission and control techniques to provide a highly efficient and highly effective method for utilizing thermal energy sources to accomplish useful work in the positive displacement movement of fluids, and/or other useful work including rotary power output converted therefrom.

One preferred controlled direct drive engine embodying various features of the present invention includes the following subsystems: a heat exchange unit (HEU) for operation in conjunction with a thermal energy source, a gas displacement unit (GDU) which employs a working fluid that is used to create a reciprocating power output, a hydraulic drive unit (HDU) which includes at least one double-acting cylinder, a positive displacement fluid displacement unit (FDU), and an electronic control unit (ECU). The following describes the functions of these subsystems in the simplest form; however, it should be understood that these subsystems are not limited to the number or type of components hereinafter mentioned.

The HEU may include a thermal energy source, a heater to heat the working fluid of the engine to an elevated temperature so as to introduce thermal energy into the system, a recuperator for recovering energy within the system, and a cooler to reject thermal energy from the system -- thus establishing a desired temperature difference between the hot side and the cold side, which is a basis for all heat engines. The GDU should include expander pistons and valves and be designed to extract energy from a fluid at elevated temperature and pressure, by expanding it to a lower pressure and temperature, and produce a reciprocating power output, preferably in combination with compressor pistons and valves to elevate the pressure of a working fluid within the system. The HDU comprises controllable hydraulic power transmission devices including a cylinder and piston and is preferably designed to facilitate providing a controlled piston velocity profile for the ultimate fluid-moving piston; moreover, it should also preferably be capable of the transfer of energy between multiple piston assemblies (which form a part of the GDU) that are being operated in complementary fashion. The FDU may include pistons and valves that are arranged to appropriately move whatever fluid that is being pumped or compressed. The EDU controls the hydraulic power transmission devices of the HDU and the expander valves of the GDU in a prescribed manner to optimize the energy transfers which are accomplished within the controlled direct drive engine system. As mentioned above, the first energy transfer is from the energy source to a working fluid, the second energy transfer is from the working fluid to the fluid that is being moved, and there is preferably a third transfer of energy between piston assemblies operating in a complementary fashion through a controlled power device.

It is understood that the engine system can utilize any of the commonly known thermodynamic power cycles, including: Rankine, Stirling, Joule, simple Brayton, recuperated Brayton, and Ericsson. The Ericsson cycle is essentially the Brayton cycle with infinite intercooling and reheating, along with highly effective recuperation. The Ericsson cycle, along with the Stirling cycle, have the theoretical potential to have an efficiency equal to the Carnot cycle, which is the standard by which all other thermodynamic cycles are compared. However, there may be particular efficiency that can be obtained through the use of a Modified Brayton cycle engine, and the incorporation of such engine may be preferred. By Modified Brayton cycle engine is meant one where the working fluid (a gas or a vapor that is always above its condensation temperature) provides power output through a positive displacement cylinder and piston device, which provides efficiency and operational advantages over more commonly used turbine energy conversion devices.

The GDU and the FDU preferably include pistons that operate within sealed cylinders, with each piston set being connected to a common reciprocating piston rod or shaft. By common rod or shaft is meant a coaxial assembly of piston rods or any mechanical interconnection of such rods so that all rods move in unison. In a preferred embodiment, three piston sets are employed that operate in a complementary fashion; however, a controlled direct drive engine system might employ one or two piston sets or more than three piston sets. When multiple piston sets are used, they are preferably driven back and forth in accordance with a prescribed velocity profile, which includes sequence timing between sets, with each having similar acceleration, controlled velocity, deceleration, and dwell periods to suit a particular pumping application. Preferably, the pistons in these sets are all double-acting, with each piston dividing its respective cylinder into two working volumes so that, as a piston strokes in one direction, one of the working volumes expands while the other working volume diminishes. However, it should be understood that such a controlled direct drive engine system could also include single-acting piston sets or plungers.

It is thus a feature of the present invention to provide a controlled direct drive engine system through which one or more piston sets may be efficiently operated in a controlled manner to optimize a velocity profile of the piston set, or sets, for an intended application from a thermal energy driven, positive-displacement power output.

It is another feature of the invention to achieve high fuel-to-fluid efficiency as compared to other pumping and compression methods, or rotary power conversion from positive-displacement output.

It is still another feature of the invention to effectively use thermal energy that is generated with low emissions or thermal energy from a variety of sources, including solar, geothermal, natural gas, exhaust heat from gas turbines, or other combustion operations to efficiently pump or compress fluids, or provide rotary power conversion from positive-displacement output.

It is yet another feature of the invention to have variable flow pumping or compressing capability without additional losses due to throttling or using of separate variable speed drives.

It is a further feature of the invention to provide smooth output flow, or other prescribed flow, by controlling piston velocity profiles when driven by a Modified Brayton cycle engine or like positive-displacement power cycles.

It is a still further feature of the invention to utilize positive-displacement power output from a thermal source to efficiently pump liquids while avoiding bang-bang operation inherent in previous direct-acting pumping methods.

It is a yet further feature of the invention to provide a thermal-powered positive-displacement engine system capable of operation at low cycle speeds so as to reduce maintenance, as well as one having low accelerations in order to allow the equipment to be mounted on conventional floors without substantial mounting foundations.

One additional feature of the invention is to provide a Modified Brayton cycle engine system that can efficiently match nearly any flow or pressure condition up to the ratings of the equipment.

Another feature of the invention is to utilize positive-displacement power output from a thermal energy source to efficiently provide rotary power output to an electric generator, or similar useful rotary output purpose.

BRIEF DESCRIPTION OF THE DRAWINGS

The above and other aspects, features and advantages of the present invention will be more apparent from the following more particular description of certain preferred embodiments thereof, presented in conjunction with the following drawings wherein:

FIG. 1 shows a prior art Rankine cycle direct-acting steam pump.

FIG. 2 shows a prior art recuperated open-loop Brayton cycle turbo engine which, without the recuperator, constitutes the cycle for conventional jet engines and gas turbine engines.

FIG. 3 shows pressure versus volume (PV) and temperature versus entropy (TS) diagrams for a prior art recuperated Brayton cycle.

FIG. 4 shows a prior art turbo closed loop Brayton cycle with intercooling, reheating, and recuperation.

FIG. 5 is a simplified block diagram of a Brayton thermodynamic cycle of a positive displacement, closed cycle type, which includes intercooling and recuperating, which can utilize a variety of thermal energy sources and which can be used in an engine or system embodying various features of the present invention.

Corresponding reference characters indicate corresponding components throughout the various figures of the drawings.

DETAILED DESCRIPTION OF THE PREFERRED EMBODIMENTS

Figure 6:
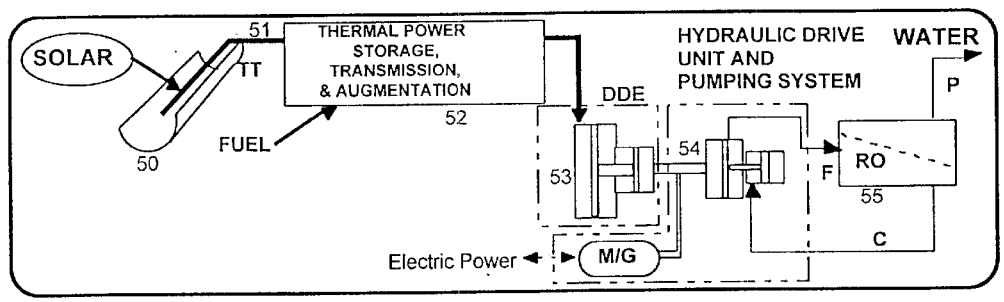
FIG. 6 is a simplified diagrammatic view showing a system embodying features of the invention which uses a solar thermal energy source with fuel augmentation to power pumping and energy recovery equipment for reverse osmosis desalination of saline water sources.

The following description includes the best mode presently contemplated for carrying out the invention. This description is not to be taken in a limiting sense as it is made for the purpose of describing the general principles of the invention, with the scope of the invention being set forth in the appended claims.

In the systems disclosed herein, the basic elements of hydrostatic transmission technology are used in a unique way to convert energy from one form to another. Instead of using hydrostatic transmission simply for the purpose of variable speed transmission, a variable displacement pump/motor is incorporated directly into an energy converting device so as to replace a conventional crank that is commonly used in most positive displacement equipment, such as pumps, compressors and engines.

In order to better appreciate the advantages and features of the present invention, it may be helpful to first briefly review prior art in this technical area. Reference is first made to FIG. 1 where there is shown a cross-section drawing of a Rankine cycle direct-acting steam pump, which is so named because a steam-driven piston is directly connected to a pump piston by means of a rod, without crank motion or flywheel. There is no cutoff or expansion of the steam, which is admitted at a constant rate throughout the stroke. The moving parts are cushioned and brought to rest by steam trapped in the steam cylinder at the end of each stroke, while full steam pressure is acting upon the opposite side of the piston.

Such a prior art direct-acting steam pump may include a steam source 400, a throttling valve 401, and a directional valve 402. The position of the valve 402 and thus the direction of steam flow is controlled by a mechanism 403. During the forward stroke, steam is admitted to the backside of a piston 404, driving that piston to the left. This force is transmitted through the drive rod 405 so as to move the pumping piston 406 to the left. In a double-acting configuration, the motion of the pumping piston 406 draws in fluid through a check valve 407 and expels fluid through an outlet valve 410. During this travel to the left, inlet valve 408 and outlet valve 409 are both closed. When the piston 404 nears the end of the stroke, the control mechanism 403 moves the directional valve 402 to admit steam to the front side of piston 404, while at the same time venting steam from the backside thereof. This slows the piston movement to a stop and reverses the direction of movement. The action during the backward stroke (to the right) of this double-acting system is similar to the forward stroke.

The velocity of the piston 404 for 80 to 90 percent of its stroke is relatively constant; it is dependant on the resulting force of the steam pressure against the piston 404 and the resistance force upon the pumping piston 406, which results from the pressure of the fluid being pumped. If the piston 406 is operating at a rate that is faster than desired, then some additional pressure drop may be introduced, as by throttling the inlet steam via valve 401, or by throttling the fluid being pumped through valves 409 and 410.

It should be readily apparent that such prior art direct-acting steam pumps are of low efficiency; hence, these pumps are not now widely used for modern liquid pumping and gas compression applications. While the direct application of steam energy to the pumping fluid is quite efficient, there are losses that result from the inability to expand the steam and thus utilize more of its available energy, the use of steam on the opposite side of the piston for cushioning the bang-bang motion, and the frequent need for throttling to control the speed of the piston travel and hence the rate of fluid pumping. These losses present several drawbacks to extensive use of such prior art pumps.

Another prior art method for energy conversion is the open cycle recuperated Brayton cycle turbo engine as shown on FIG. 2. Where the Rankine cycle constitutes a combined liquid and vapor method for conversion of thermal energy to mechanical power, the classic Brayton cycle is an all-gas cycle. The jet engine and the gas turbine are familiar application of the Brayton cycle; they are simple cycles, which usually do not incorporate a recuperator. A recuperator can be added to improve the efficiency of the energy conversion.

In the open loop recuperated Brayton cycle engine depicted in FIG. 2, air is drawn in at temperature T1 and compressed to a higher pressure and T2 in the turbo compressor. Its temperature is then increased to Tx in the recuperator, and then further increased in the combustor to T3. The high temperature and high pressure gas then expands through the turbo expander to T4 while at the same time creating rotary power to drive the back work of the compressor and a usable power output. The thermodynamic pressure versus volume (PV) and temperature versus entropy (TS) diagrams for such a recuperated Brayton cycle are shown in FIG. 3.

A further prior art variation of the Brayton cycle is shown in FIG. 4. This variation includes intercooling between compression stages and reheating between expander stages, which improves the cycle thermodynamic efficiency. With infinite intercooling and reheating, along with 100% recuperation effectiveness, this variation approaches the efficiency of the Ericsson cycle.

A simplified block diagram of a double-action direct drive engine system having various features of the present invention is depicted in FIG. 5. This system, while having some similarities to the prior art pump shown in FIG. 1, is in fact much different; moreover, it addresses the above-mentioned drawbacks, as well as other shortcomings of such prior art direct-acting pumps. The FIG. 5 system operates on a closed loop Modified Brayton cycle and is fully capable of utilizing thermal energy from a variety of sources; moreover, its positive displacement compression and expansion can achieve higher efficiency than a FIG. 4 system.

As diagrammatically represented in FIG. 5, there may for example be thermal energy input from both solar and from fuel combustion. In the system, a first-stage compressor piston 11 reciprocates in a double-acting cylinder 11a, a smaller second-stage compressor piston 15 reciprocates in a double-acting cylinder 15a and an expander piston 21 reciprocates in a double-acting cylinder 21a.

During the backward stroke to the right (which is illustrated), the compressor piston 11 expels gas from working chamber 12 through intercooler 13 into a smaller working chamber 14. The movement of piston 15 compresses gas in a working chamber 16 to temperature T2 and forces the gas to flow through a recuperator coil 17, where its temperature is increased to Tx. This gas stream then travels through a solar heater 18, and optionally then through a combustion heater 19, exiting at a temperature T3 and entering a working cylinder 21a of the expander chamber 20 where it drives piston 21. The movement of piston 21 expels gas from working chamber 22 of the cylinder 21a, which gas had previously been expanded therein causing its temperature to drop to T4. The gas at T4 enters the recuperator coil 23 where it cools to temperature Ty as some of its thermal energy is transferred from coil 23 to coil 17. The gas exiting the coil 23 of the recuperator then travels to cooler 24 where it is cooled to temperature T1 before it enters chamber 10 and begins the closed loop cycle again.

During the forward stroke (to the left), the functions of the three cylinders 11a, 15a and 21a are similar to the backward stroke, except in the reverse direction. The reversal of action within the three cylinders is accomplished by means of valving (not shown) as generally known to the art of double-acting cylinders, and this is discussed later in conjunction with operation with multiple piston assemblies.

The respective pressures in the working chambers 10, 12, 14, 16, 20, and 22 and the areas of the respective pistons 11, 15, and 21 results in a net positive reciprocating force being transmitted to the reciprocating drive rod or shaft 25. This reciprocating positive force provides usable power output that might be employed by liquid pumping or compression, e.g. by driving a pumping piston 406 in a fashion similar to that shown in FIG. 1.

Figure 8:
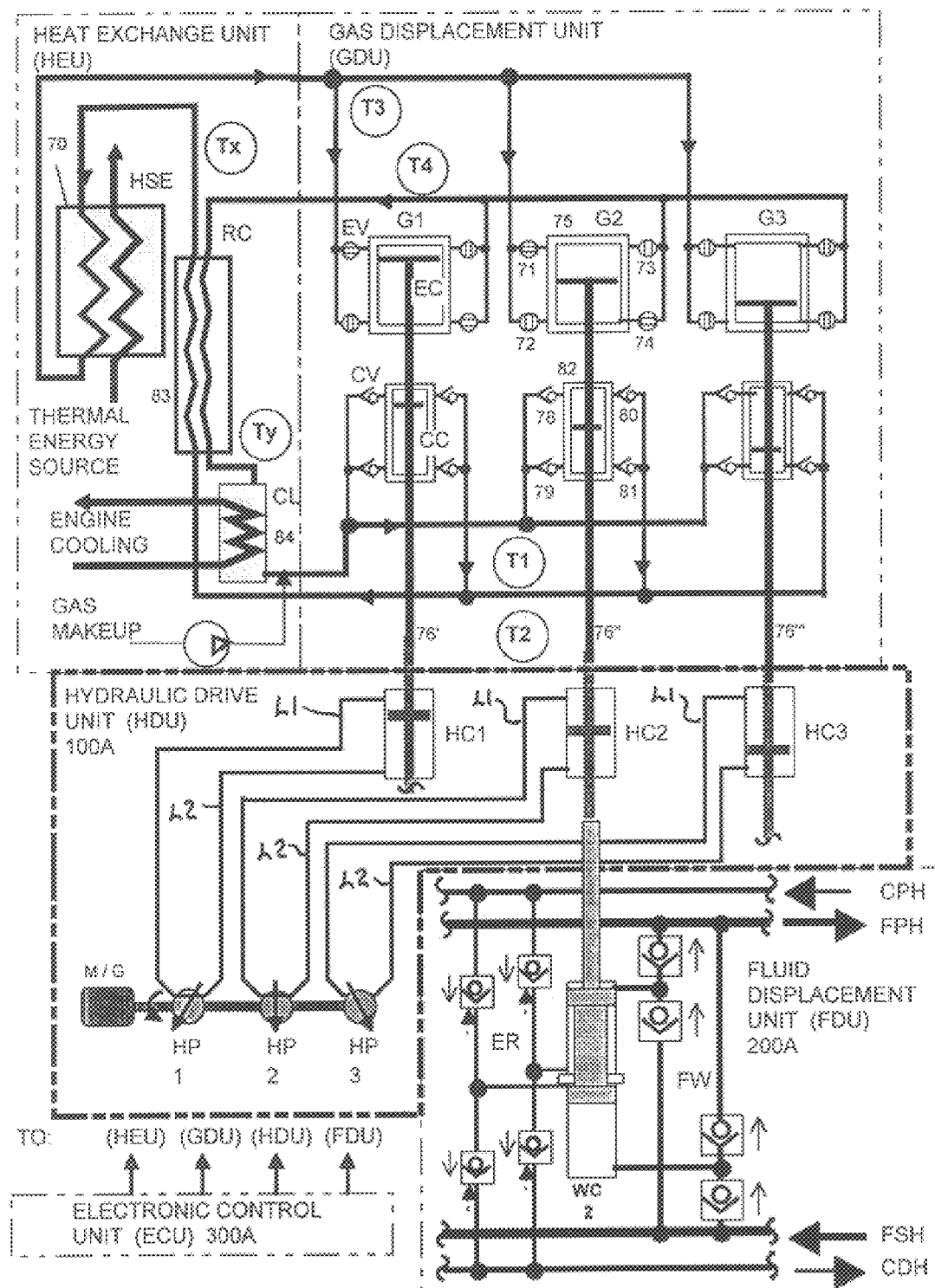
FIG. 8 is another diagrammatic view of a system embodying various features of the present invention to power a fluid displacement unit in a controlled and complementary fashion in conjunction with a hydraulic drive unit and an electronic control unit.
Figure 9A:
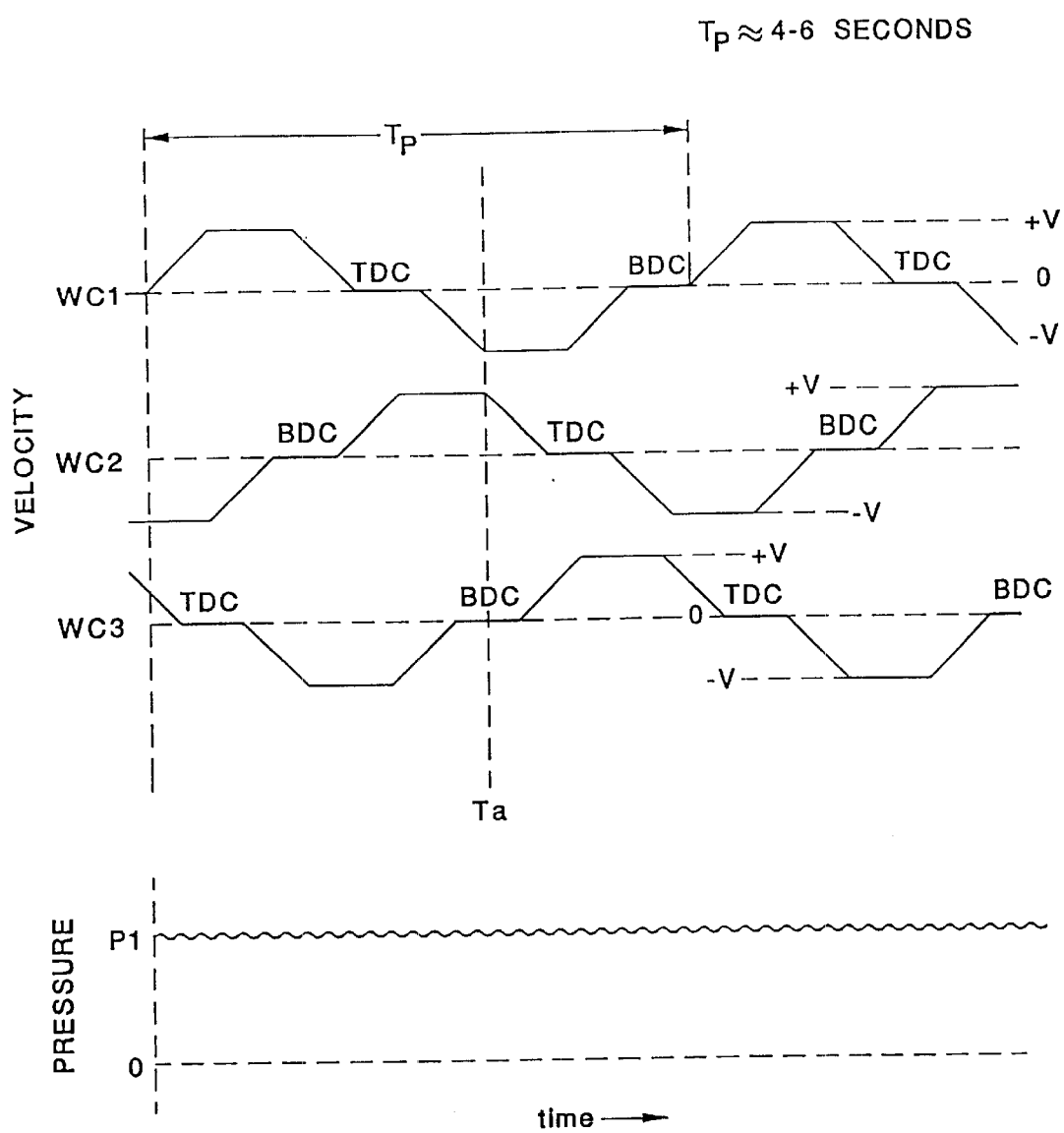

Very generally, a hydraulic drive unit (HDU) 26 is used to carefully control the velocity profile of such a piston assembly and in this manner efficiently utilize such positive displacement power output to efficiently carry out a desired pumping profile where the pumping piston (which is preferably double-acting) follows a pattern of acceleration, constant velocity, deceleration and dwell. An additional particularly valuable function of the HDU becomes apparent when multiple, e.g. three, piston assemblies are used (FIG. 8). Whenever there is excess power output driving one piston assembly at its desired controlled velocity profile, the hydraulic drive unit 26 is able to transfer such excess power to another piston assembly. Conversely, when there is insufficient power to drive one piston assembly at its profile, the hydraulic drive unit 26 will extract sufficient energy from one of the other piston assemblies to maintain the desired velocity profile. Such transfers of energy are explained in more detail hereinafter, and they are accomplished through the use of hydraulic motor/pumps (HP), and optionally a motor/generator (M/G) as depicted. From one aspect, the function provided by the hydraulic drive unit may be generally compared to the function provided by a crank in a conventional reciprocating engine, except that the piston velocity profile can be nearly any suitable shape, including trapezoidal, whereas in the case of the crank, the velocity profile is limited to motion that is sinusoidal, or very close to sinusoidal, through its connecting linkage.

The power output of the present invention may be used for a variety of pumping and/or compression applications. One such application is the desalination of water using solar power, with or without augmentation with additional thermal energy from the combustion of fuel; such is illustrated schematically in FIG. 6. In this application, solar thermal energy is collected in a concentrator 50 by means of a transfer fluid that travels in closed loop piping 51. During night time, the thermal energy in the transfer fluid that is traveling in piping 51 can be augmented by fuel combustion, or from thermal energy that has been previously stored by means of any suitable thermal power storage, transmission, and augmentation system 52. The resulting thermal energy is transferred to a direct drive engine (DDE) system 53, similar to that shown in FIG. 5. Reciprocating power from the direct drive engine system 53 is transmitted as, for example, by a common rod or shaft, to a hydraulic drive unit and to a pumping system 54. The pumping system 54 is operated to provide high pressure feed water (F) to cartridges or the like which utilize reverse osmosis (RO) membranes to produce purified product water (P) and a concentrate stream. The concentrate (C) stream returns to the pumping system 54 where pressure energy is recovered. Details of such a system are shown in U.S. Pat. No. 6,017,200, the disclosure of which is incorporated herein by reference. FIG. 6 is one example of how such a system may efficiently utilize solar energy to produce purified water from seawater or some other saline water source through the use of the RO desalination process.

Figure 7:
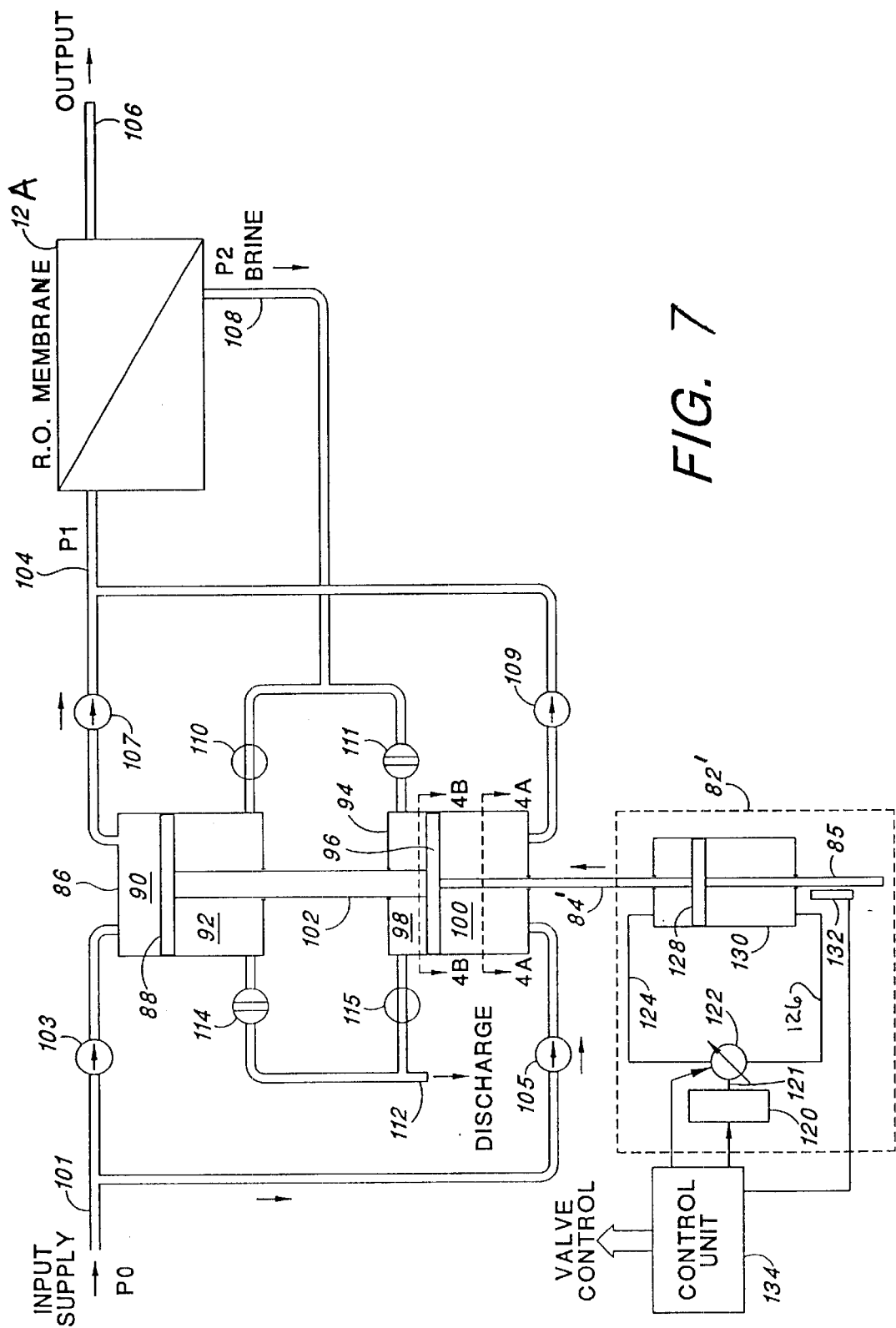
FIG. 7 is a simplified block diagram showing one fluid displacement unit and a control unit for a hydraulic drive unit that simply illustrates how pumping and energy recovery might be used for reverse osmosis desalination.

More specifically, because the controlled direct drive engine system is considered to be particularly adapted for use with reverse osmosis desalination systems to produce potable water from either brackish water or seawater, such a simplified system is shown in more detail in FIG. 7, which provides greater detail than FIG. 6 with respect to an exemplary pumping system, although it does not show the mechanical interconnection of the rod 85 to the direct drive engine which would be in existence in this overall system—as shown in more detail in FIG. 8. This view demonstrates some of the principles involved in systems embodying features of the present invention and may be helpful from that standpoint. Because significant savings in operating costs can be realized with such a system, the extraction of pure water from saline water sources is expected to become economically viable in situations where heretofore the economics have not been favorable.

The simplified block diagram of a double-action integrated energy recovery system depicted in FIG. 7 includes a hydraulic drive unit (HDU) 82' that provides force to reciprocate a common piston rod or shaft 84' alternately in a forward stroke and then in a backward stroke. The lower end of a piston rod 85 which is a part of the HDU should be understood to be mechanically linked to the reciprocating power output (not shown) from the gas displacement (GDU) shown in FIG. 8. Two cylinders, each having a piston therein, are linked to the reciprocating piston rod 84' and, along with their associated valving, form the fluid displacement unit (FDU) as shown in FIG. 8. A first cylinder 86 has a first piston 88 mounted for reciprocating motion therein which divides the first cylinder into a first working volume 90 and a second working volume 92; the first working volume 90 contracts during a forward (upward) stroke of the piston 88, while the second working volume 92 expands during such forward stroke. In a similar manner, a second cylinder 94 has a second piston 96 that divides the second cylinder into a first working volume 98 and a second working volume 100.

The first and second pistons 88 and 96 are mechanically linked to each other by an extension 102 of the reciprocating rod 84' so any reciprocating motion of the rod 84' causes joint motion of the piston 96, the extension 102, and the piston 88. Thus, during a forward (upward) stroke of the rod 84', both the piston 96 and the piston 88 move from a fully retracted position (at or near the back or bottom end) to a fully extended position (at or near the front or top end) of its respective cylinder.

The reciprocating power output drives the shaft 84' to provide reciprocating power for the FDU. Common terminology associated with such reciprocating power sources refers to the position of the piston rod 84' as extending to a "top dead center" (TDC) position and then retracting to a "bottom dead center" (BDC) position. The most forward (up) position of the pistons 88 and 96 in their respective cylinders for a given cycle is herein referred to as a TDC position as a BDC position.

Although shown as separate cylinders, the two cylinders 86 and 94 may be integrated into a single cylinder housing. However, the two cylinders 86 and 94 would still function as two separate cylinders, each having its respective piston 88 or 96 mounted for reciprocating motion therein, linked together by the rod 102.

The input fluid supply, obtained at input header 101 at a modest pressure P0, is directed through a check valve 103 to the first working volume 90 of the first cylinder 86 and through check valve 105 to the second working volume 100 of the second cylinder 94. Similarly, the pumped output fluid, at a high pressure P1, is directed through a check valve 107 from the first working volume 90 of the cylinder 86 to a high pressure output header 104, and through check valve 109 from the second working volume 100 of the cylinder 94 to the output header 104. The output header 104, in turn, connects with the input port of a RO membrane cartridge 12A.

The RO membrane 12A provides a permeate output stream through output port 106 and a high pressure brine or concentrate stream (e.g., at pressure P2, where P2 is less than P1 by a small amount) at a discharge header or port 108. This high-pressure brine stream is selectively connected through energy recovery valves 110 and 111 to either the second working volume 92 of the first cylinder 86 or to the first working volume 98 of the second cylinder 94. Brine is selectively discharged from the working volume 92 of the first cylinder 86 through discharge valve 114, and from working volume 98 through discharge valve 115, to a discharge port 112.

In operation, the high pressure brine stream is directed through one of the energy recovery valves 110 or 111 to whichever of the working volumes 92 or 98 is expanding or will expand during the current piston stroke. The high pressure P2 associated with the brine stream thus serves to force the respective piston (88 or 96) in the direction of the piston stroke. That is, during a forward (upward) stroke of the piston 88, the brine stream is connected through energy recovery valve 110 to working volume 92, thereby permitting the high pressure P2 of the brine stream to assist in forcing the piston 88 in its forward stroke. During this same forward stroke, the forward movement of piston 96 expels any brine remaining in working volume 98 out through discharge valve 115 to the discharge port. During a backward (downward) stroke of the pistons 88 and 96, the brine stream is connected through energy recovery valve 111 to working volume 98, thereby permitting the high pressure P2 of the brine stream to assist in forcing the piston 96 in its backward stroke. During this same backward stroke, the backward movement of piston 88 expels any brine remaining in working volume 92 out through discharge valve 114 to the discharge port.

By directing the high pressure brine stream into working volume 92 of the first cylinder and into working volume 98 of the second cylinder in this manner, the pressure differential across the pistons 88 and 96 is significantly reduced, i.e. essentially P1–P2. For example, if P1 is 1000 psi and P2 is 950 psi, then the pressure differential is only about 50 psi. This low-pressure differential significantly improves the operating life of the pistons 88 and 96 within their respective cylinders 86 and 94.

The energy recovery valves 110 and 111, as well as the discharge valves 114 and 115, are switched from one position to another position (i.e., are switched from CLOSED position to OPEN position, or from OPEN position to CLOSED position) at a time during the pump cycle when the flow rate of the brine, as set by the desired velocity profile of the pistons 88 and 96, is essentially zero. This makes the switching of these valves a relatively painless and efficient process compared with what would be required if the valves were switched at a time of maximum, or moderate, or other non-zero flow rate.

A control unit 134 (which would be part of ECU 300A shown in FIG. 8) generates control signals needed to control the energy recovery valves 110 and 111, as well as the discharge valves 114 and 115. A position sensor 132 is used to monitor the linear position of the piston rod 84' so that the control unit receives feedback information regarding the location of the rod 84', and hence the location of the pistons 96 and 88, at any given time during the pump cycle. The sensor 132 is shown adjacent rod section 85 but could be anywhere along the length of this mechanically integrated rod. The sensor 132 may be any suitable linear sensor as is known in this art. A "pump cycle" should be understood to comprise a full forward stroke followed by a full backward stroke of the piston rod 84'. The ECU 300A would include the control unit 134 that controls the associated mechanism of the HDU throughout the pump cycle to carry out its function, as explained hereinafter.

Energy recovery valves 110 and 111, and the discharge valves 114 and 115, operate as a group. At the beginning of a forward stroke and throughout the duration of the forward stroke, energy recovery valve 110 should be OPEN, energy recovery valve 111 should be CLOSED, discharge valve 114 should be CLOSED, and discharge valve 115 should be OPEN. At the beginning of a backward stroke and throughout the duration of the backward stroke, energy recovery valve 110 should be CLOSED, energy recovery valve 111 should be OPEN, discharge valve 114 should be OPEN, and discharge valve 115 should be CLOSED. Any suitable commercially available valves may be used as the energy recovery valves 110 and 111, and the discharge valves 114 and 115.

Figure 10:
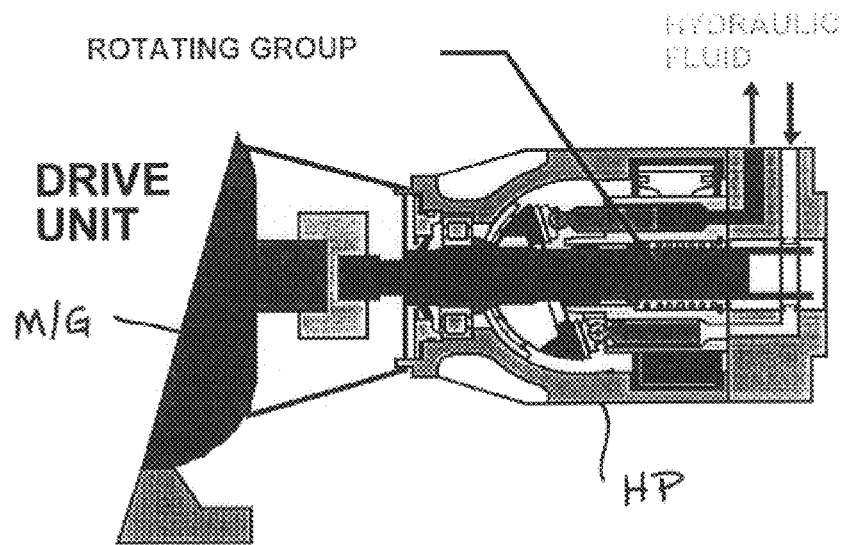
FIG. 10 is a cross-sectional view which diagrammatically shows the operation of a representative rotary hydraulic motor/pump of the variable volume type.

With respect to the present invention, a hydraulic motor/pump or power unit 122 functions as a part of the HDU 82', serving sometimes as an assisting power source for driving the reciprocating piston rod 84' and at other times to transfer excess power to another piston assembly. One preferred assisting power source that can complement the power output from the GDU shown in FIG. 8, so as to impart a desired velocity profile to the piston rod 84' is a variable volume, positive displacement hydraulic power unit of the general type disclosed as power unit 20 in U.S. Pat. No. 4,145,884, entitled "Reversible Power Transmission", the disclosure of which is incorporated herein by reference. FIG. 10 shows an example of such a rotary power unit (HP), which can function either as a hydrostatic pump or a hydrostatic motor. As explained in detail in the '884 patent, the unit includes a rotating group and a thrust plate or swash plate which is tiltable to provide a cam surface of varying angle. The rotating group consists of pressure-balanced pistons and slippers (e.g. nine of them), a barrel in which they are slidably received, a kidney-shaped valve port plate, a central shaft and hold-down springs. The swash plate is stationary and is tilted to a desired annular position, as shown, which causes the pistons to be driven in and out as the shaft and barrel rotate. This causes hydraulic fluid to be drawn in and pushed out through the valve port plate. When the swash plate is tilted more toward a central, i.e. vertical, orientation, the fluid flow is reduced proportionately to zero. When the swash plate is moved to the other side of center from that illustrated in FIG. 10, the direction of flow reverses in direct proportion to the angle of the cam surface presented by the swash plate orientation. In a typical servo-control system, a servo valve might supply fluid to a swash plate actuator, acting in association with a position feedback transducer that provides the angle of movement, relative to whatever command signal is received from the signal generator. Such servo control is conventional in the art.

In the illustrated embodiment shown in FIG. 7, the hydraulic power unit 122 is connected through a power takeoff shaft 121 to a suitable engine or motor 120, which may be a motor/generator (M/G) in the preferred embodiment. Such a variable volume positive displacement hydraulic power unit can, on command, produce zero to full hydraulic discharge flow through either hydraulic line 124 or line 126, and as explained hereinafter, it can alternatively function as a hydraulic motor if liquid is supplied to it under pressure. Hydraulic line 124 connects to one end of a double-acting hydraulic cylinder 130, and hydraulic line 126 connects to the opposite end of cylinder 130 (FIG. 7). Located in cylinder 130 is piston 128, and connected to opposite sides of piston 128 is a common piston rod having piston rod sections 84' and 85, forming a double-acting cylinder that operates in a closed loop manner with hydraulic power unit 122. The rod section 84' is coaxial with and connected to the piston rod 102 of the water pumping cylinders, and the rod section 85, in the systems of present interest, is connected to the direct drive output shaft (not shown). Therefore, power applied to this piston 128 will assist the GDU in driving the FDU as shown in FIG. 8, and excess power momentarily generated by the GDU can be taken advantage of and used to drive the takeoff shaft 121. Linear displacement of the double-acting piston 128 in cylinder 130 causes the exact same linear displacement of piston 96 in cylinder 94 and piston 88 in cylinder 86, which is also equal to the linear displacement of the cylinder or cylinders in the GDU.

Figure 9:
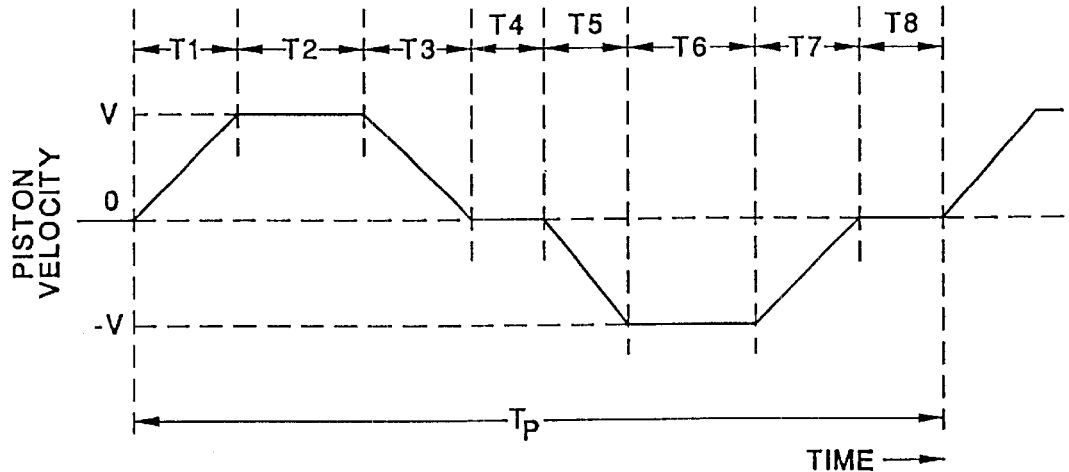
FIG. 9 shows one example of a controlled piston velocity profile which might be used for a fluid displacement unit which includes three pumping cylinders to provide smooth output flow rate for a liquid pumping application.

Because the hydraulic piston 128 operates in a closed loop manner with hydraulic power unit 122, the movement, i.e., acceleration, constant velocity, and deceleration, of the pistons 96 and 98 can be controlled to produce a desired piston velocity profile. Such a profile is depicted in FIG. 9 where one exemplary pump cycle $T_p$ is illustrated. It is assumed that the piston rod 84' (as well as the pistons 88 and 96) is initially in its fully retracted position, at the end of a backward stroke. The pump cycle starts with a forward stroke during which the rod is linearly accelerated from rest (zero velocity) up to a velocity V for a time period T1. Then, the velocity V is maintained for a time period T2 (a constant velocity period) as the rod continues its forward stroke. As the rod approaches the end of the forward stroke, a deceleration period T3 begins, during which the rod decelerates from velocity V to zero. Once the rod is stopped, at the conclusion of the forward stroke, it remains stopped for a short dwell time T4. As the rod begins its backward stroke, it is linearly accelerated in the backward direction to a velocity −V for a time period T5. The velocity −V is then maintained for a time period T6 (a constant velocity period) as the rod continues its backward stroke. As the rod approaches the end of the backward stroke, a deceleration period T7 begins during which the rod decelerates from velocity −V to zero. Once the rod is stopped, at the conclusion of the backward stroke, it remains stopped for a short dwell time T8. The sum of times T1 to T8 equal Tp, the time of one cycle.

The sensor 132 (FIG. 7) provides feedback information needed to control motion of the piston rod 84' through the time periods T1–T8 during a given pump cycle. Such feedback information is received and monitored by the control unit 134, and the control unit 134 then controls the power unit 122 to produce the desired linear motion of the piston rod 84'.

The values of the time periods T1–T8 are dependent upon the particular application with which the energy recovery system is being employed. For an exemplary desalination RO system, employing pistons having a diameter of 8 inches, and a stroke length L=5 inches, representative approximate values for the time periods T1–T8 may be approximately as follows: T1=T3=T5=T7=0.75 seconds; T2=T6=1 second; T4=T8=0.5 seconds, making a pump cycle time $T_p$ of about 6 seconds, or a pump cycle rate of approximately 10 cycles per minute.

The energy recovery valves 110 and 111 and the discharge valves 114 and 115 are only switched from a CLOSED to an OPEN state, or from an OPEN to a CLOSED state, only during the dwell time periods T4 or T8, assuring that the valves are switched at a time when the flow rate of the fluid through the valves is zero. Such timing not only makes the mechanical closing or opening of the valves an easier and more efficient task (performed through the expenditure of less energy), but also improves the life of such valves.

FIG. 8 is a block diagram showing a controlled direct drive engine system embodying various features of the present invention wherein three reciprocating piston assemblies (each of which may be the type described above in connection with FIGS. 5 and 7) are employed. The motion of each of the respective piston assemblies is phased 120 degrees apart from the other two. As depicted in FIG. 8 for the gas displacement unit (GDU), three gas cylinder assemblies, G1, G2, and G3 are employed which include expander cylinders (EC) and compression cylinders (CC) for each assembly, as described with respect to FIG. 5. Connected to each of these gas cylinder assemblies are either four expander valves (EV) 71–74 as well known in this art, generally similar to the valves 110–115 described hereinbefore (FIG. 7), or four compressor valves 78–81 that are check valves similar to the valves 103–109 and open and close automatically depending on the direction of movement of the compressor piston. Opening and closing of the expander valves is controlled by an electronic control unit (ECU) 300A. Each of the above-mentioned three piston assemblies provides reciprocating power output to a composite hydraulic drive unit (HDU) 100A which is, in turn, suitably linked to a composite fluid displacement unit (FDU) 200A which includes three interconnected individual units of the type diagrammatically shown in FIG. 8. The FDU 200A may include pumping or compression pistons similar to the piston 406 of FIG. 1; however, it preferably includes an arrangement similar to that illustrated in FIG. 8. The HDU 100A provides a control power function to assure that the piston assemblies are stroked in a complementary fashion and with velocity profiles as deemed desirable for an intended application. The electronic control unit 300A provides control algorithms (i. e. the brains) to control the total overall system, which includes the HDU 100A and the expander valves (EV) in the GDU, to accomplish the desired objective. These are state of the art control functions that are merely specific versions of a standard control program which is state of the art and will vary as times and stroking velocities are changed to accommodate different pumping rates, or operating conditions.

The controlled direct drive engine system includes, as another subsystem shown in FIG. 8, a heat exchange unit (HEU). The major components of the HEU are a heat source exchanger (HSE) 70, a recuperator (RC) 83, and a cooler (CL) 84. A gas makeup supply constitutes another component of the system; it maintains the gas pressure within the closed working fluid loop at a desired level. Generally, any suitable gas, e.g. air, $N_2$, $H_2$, He, $CO_2$, etc, or vapor having a sufficiently low condensation temperature so condensation will not occur, may be used. The HSE can utilize any number of thermal energy sources, separately or together, such as solar power and/or fuel combustion as depicted in FIGS. 5 and 6. Other examples of thermal energy sources include geothermal heat and hot exhaust gas from gas turbines or the like. While the diagram in FIG. 8 shows the thermal energy input into the engine system through a heat exchanger, it is understood that the invention can be implemented by combustion within the closed loop, by means of an appropriate system to introduce combustible materials, and an appropriate method to expel the combustion products, as generally described with respect to FIG. 2.

Because this controlled direct drive engine system uses positive displacement and because of the control features, it can operate very efficiently over a wide range of temperature and pressure conditions. This capability allows it to also utilize stored thermal energy, thus facilitating storing solar thermal energy during the daytime and using such stored energy during nighttime operation.

Thermal energy introduced into the system at the heat source exchanger 70 is employed to increase the temperature of a working fluid to temperature T3. In FIG. 8, this hot gas is being admitted through an inlet expander valve 71 into the head end of a double-acting expander cylinder 75, driving a piston assembly 76" forward (i.e. downward in FIG. 8). In the illustrated embodiment, the expander valve 71 is about to be closed by the ECU shortly after the mid-stroke (i.e., the cut-off point labeled in FIG. 3); thereafter, the hot gas in the chamber expands to continue to drive the piston downward while it falls in temperature from T3 to T4. By properly sizing and controlling the system, substantially all of the available energy can be extracted from the gas. The downward movement of the piston assembly 76" causes gas in the working chamber on the back side of the piston (which was previously expanded) to be expelled through an exit valve 74 at about temperature T4. Such gas from all three cylinders is manifolded into a single line and sequentially travels to the recuperator (RC) 83, where the gas temperature decreases to about Ty, and then proceeds to the cooler (CL) 84, which cools the gas to temperature T1. The cooler can use ambient air, water or any other heat sink material. Make-up gas may be added as required as well known in this art.

During such forward stroking period, valves 72 and 73 of the expander cylinder are closed; however, the movement of the interconnected piston within the compressor cylinder of the piston assembly results in cool gas, at temperature T1 being drawn though check valve 78 into the upper working chamber of the compressor cylinder 82. At this same time, gas at a higher pressure is being expelled through check valve 81, with its temperature having been raised to T2 as a result of such compression. During this period, check valves 79 and 80 remain closed. This high-pressure gas, at T2 temperature, flows through the recuperator (RC) 83, where its temperature increases to Tx. The gas then enters the heat exchanger 70, where its temperature is increased to T3. On the next backward stroke, the two working chambers of the double-acting piston assembly 76" operate in the reverse direction just described with respect to the forward stroke, with the EV valves 71 to 74 and CV valves 78 to 81 that were previously open now being closed, and vice versa.

The output force and power of the piston assembly 76" associated with gas cylinder assembly G2 that is transmitted to the fluid displacement unit (FDU) 200A, i.e. more particularly to the individual pumping unit that includes WC2, passes through the hydraulic drive unit (HDU) 100A which is mechanically connected between the two coaxial sections 76" (FIG. 8) and 84' (FIG. 7) as part of the composite common rod. Piston assemblies 76' and 76''', associated respectively with gas cylinder assemblies G1 and G3, similarly supply force and output power to the HDU 100A and to the individual pumping units of FDU 200A. As previously mentioned, the three individual subunits of the GDU are operated in a complementary fashion, being phased 120 degrees apart (on a complete cycle of 360°) to assure smooth operation, as schematically shown by the positions of the various pistons in FIG. 8. The phasing of the piston assemblies 76', 76", and 76''', to accomplish their desired driving functions, is controlled by the electronic control unit (ECU) 300A via opening and closing actuation of the associated expander valves EV, and controlling the hydraulic pumps (HP1, HP2 and HP3). The force and power output delivered by the multiple piston assemblies of the gas displacement unit (GDU) is regulated by the HDU which can supplement the force as needed and can transfer excess force to another piston assembly at a different phase in its pumping operation, thereby facilitating particularly efficient operation. The sequential operation of three interconnected water pumping units is described in the '200 patent and is depicted in FIG. 9. It should be understood that the ECU will synchronize the operation of the respective subunits of the HDU so that each expander piston will reach the intended end of its stroke when the pumping pistons (88, 96) of FIG. 7) reach a dwell period.

Summarizing the output of such a system wherein three reciprocating water pumping units are employed, the motion of their respective pistons would be phased to be 120 degrees apart. As depicted in FIG. 8, each of these water cylinders preferably comprises first and second cylinders of the type shown in detail in FIG. 7, with one being stacked on top of the other to give the appearance of a single cylinder. WC2, which is shown, has lines connected to the top and bottom of each cylinder, which lines represent pipes that connect through appropriately valved conduits to a feed supply header FSH, a feed pressure header FPH, a brine or concentrate pressure header CPH, and a concentrate discharge header CDH. The piston rods which operate the WCs are mechanically connected with and driven by the piston assemblies 76', 76", and 76''', and each set includes one of three hydraulic cylinders HC1, HC2 and HC3 of the HDU as a part of a common (preferably coaxial) rod or shaft. Each hydraulic cylinder includes a double-acting piston therein that moves forward or backward as a result of its mechanical interconnection with a piston assembly output shaft of one of the units of the GDU. The function of the HCs is to allow additional power to be applied to one assembly or to remove excess power therefrom, via regulating the flow of hydraulic fluid in lines L(1) or L(2) as controlled by power unit HP. As shown in FIG. 8, HC1, HC2 and HC3 function as part of the HDU, being respectively, fixedly mechanically linked to one of the common piston rod assemblies of the GDU, so as to move linearly therewith. Hydraulic power units HP1, HP2 and HP3 may be driven by a single linear power takeoff shaft, as shown, which is connected to a rotary motor/generator (M/G); alternatively, they could have individual drives that are suitably interconnected, as by gears or the like, to operate in unison. Each power unit HP is controlled by control unit, which is part of the ECU 300A, to add or subtract power as necessary. An example of such an installation employing three power units of the type shown in FIG. 10 is presented in FIG. 11.

Each of the water cylinders should include corresponding valves and controls as explained above in connection with WC2, and any number of water cylinders may be connected in parallel to produce a desired pressure and flow output. In FIG. 8, three such water cylinders are contemplated, being connected in parallel for pumping purposes, with one WC connected to each of the piston assemblies 76', 76" and 76'''. However, this number is only exemplary, and any number n of water cylinders, with associated valves, could be so connected. Typically, n is an odd integer, such as one, three or five, but it need not be so limited. In general, if n WC's are employed in a given system, then the relative phasing between the respective pistons of each of the n WC's should be 360°/n.

Such timing or phasing is illustrated in FIG. 9, which shows the velocity profiles associated with the pistons of three exemplary water cylinders WC1, WC2 and WC3. The movement of the rods 84' (FIG. 7) associated with each of the three WCs is timed or phased so that, as one piston approaches its constant velocity position, another is just leaving its constant velocity position, and yet another is at its BDC position. This can be seen in FIG. 9 at time Ta, i.e., when WC1 is about the end of its acceleration period in the backward direction, WC2 is at the end of its constant velocity period in the forward direction, and WC3 is at its BDC position. By phasing the motion of the cylinders in this manner, a fairly constant pressure P1, without undesirable pressure fluctuations, is obtained at the feed pressure header, FPH. Such constant pressure P1 is also illustrated in FIG. 9.

As previously mentioned, the ECU controls the expander valves (EV) of the G1, G2 and G3 subunits to produce an appropriate amount of power during each stroke.

Figure 11:
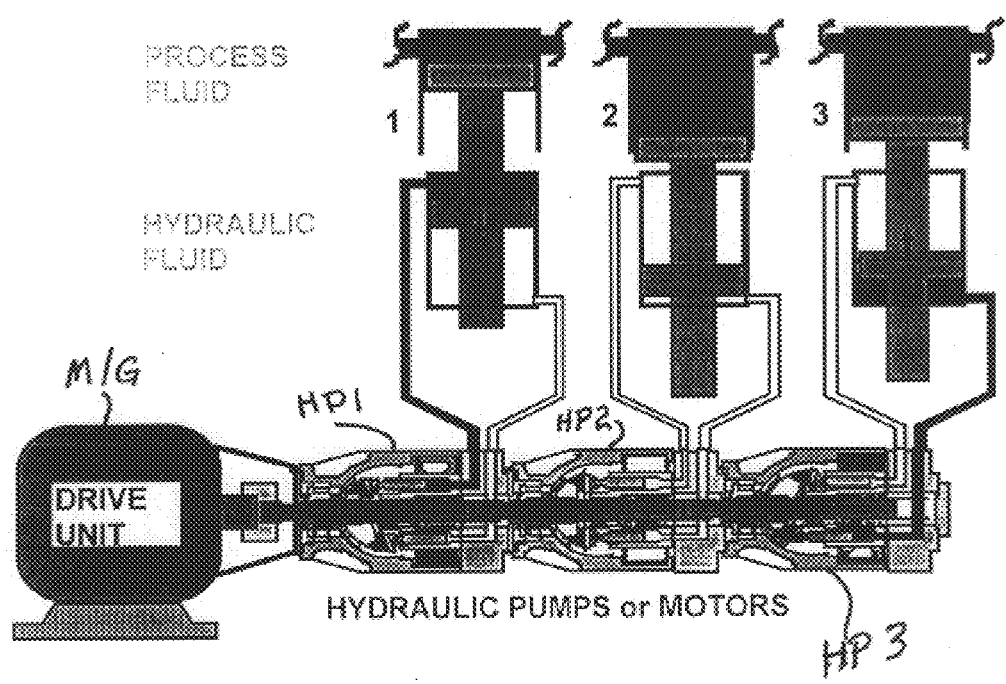
FIG. 11 is a schematic view showing three such rotary power units connected to a common rotating shaft and associated with three hydraulic cylinders being used for control purposes that are respectively linked by a common rod with three single-acting pumping cylinders.

FIG. 11 schematically illustrates the employment of three hydraulic power units (HP) that can each function either as a motor or a pump, rotating on a common rotary shaft as they might be used to control and transfer power between three separate rods that are depicted as driving pistons in fluid-displacement units, here labeled simply 1, 2 and 3. Although not shown, it would be understood that the opposite end (here the lower ends) of each of the double-acting piston rods of the hydraulic cylinders would be mechanically interconnected with the power supplying rods 76', 76" and 76''' (FIG. 8) that carry the power output from the GDU. For purposes of simplification of explanation, the fluid-displacement cylinders for the process fluid are shown as being single-acting cylinders.

Fluid-displacement Unit No. 1 (FIG. 11) is shown as having completed its power stroke and thus is being returned to its lower position so that the swash plate is angled to the left so that rotation of the rotating group causes hydraulic fluid to be admitted into the upper working chamber of the double-acting hydraulic cylinder. In Unit No. 2, the piston is stopped at the bottom of its stroke and the swash plate is accordingly shown as being oriented at its center condition with the cam surface vertical. The piston in fluid displacement Unit No. 3 is shown as pumping liquid, and accordingly the swash plate is angled to the right so that hydraulic fluid is being admitted to the lower working chamber of the double-acting cylinder. It should be understood that the "drive unit" shown in FIG. 10, and FIG. 11, could be an electric motor, an electric motor/generator (M/G), or other suitable rotary device.

From the standpoint of transferring power between the different composite common rods, for example, if at some time during the cycle of any of the three hydraulic pumping units there might momentarily be insufficient power being provided by the power output from the interconnected expander of the GDU (FIG. 8), the control system would tilt the swash plate correspondingly to provide a hydraulic assist via the rotary power unit and would be taking this power from the rotating shaft. If, at the same time, one of the other units is experiencing a condition where there is excess power, so that the corresponding power unit and its swash plate is tilted to retard the longitudinal movement of that common pumping rod, this causes the associated hydraulic power unit (HP) to serve as a motor, inputting power into the shaft, which is of course inherently transferred to the power unit that is assisting the associated composite common rod at that moment. The ends of the strokes match the dwell periods of the pumping pistons which is accomplished by simply so spatially locating the GDU and the FDU and/or adjusting the length of an intermediate section of each common shaft. The HDU operating through the respective hydraulic power units HP1, HP2 and HP3 adds and subtracts power on each stroke of each piston assembly to achieve the desired velocity profile.

Control of such an HDU is achieved by using suitable control algorithms as well known in this art for timing operations; the controller regulates each hydraulic power unit to add or subtract power as necessary via the HCs to produce the desired velocity profile for the pistons associated with each cylinder. In essence, the HP is regulated to appropriately assist or momentarily retard the reciprocating power output of each subunit of the GDU. When retarding occurs, the excess power is being transferred through the rotating drive shaft to another piston assembly. Such control is readily achieved by those of skill in the art using a personal computer, or equivalent processor, programmed to drive the piston rods 84' of each cylinder to track the respective velocity profile shown in FIG. 9.

Such tracking can be effectively achieved using hydraulic power units of the type described in the '884 patent which operate in a closed loop fashion; however, other types of devices that provide the desired phased relationship may alternatively be used, e.g., directional valves, servo valves, etc. Integral to all such control arrangements is the inclusion of a position sensor 132 that is associated in some fashion with the common rod of each assembly to allow tracking the precise relative location of, for example, the piston 88 in the cylinder 86 (FIG. 7) and thereby carefully control the movement as necessary to produce the desired velocity profile.

It was found that the Modified Brayton cycle engine, preferably with recuperation, matches up quite well with the above-mentioned preferred velocity profile for the pumping pistons which, as mentioned above, desirably have sequences of acceleration, constant velocity, deceleration and then dwell. In the Modified Brayton cycle, output power from the expander cylinders occurs near its maximum during the time that the expander valve 71 is first opened and the high temperature, high pressure gas is exerting full force onto the piston in the cylinder 75 (FIG. 8). This force complements the power required to accelerate and then drive the piston at constant velocity. Timing may be set such that the valve 71 is closed, i.e. the cut-off point (FIG. 3), when the pumping piston is near the end of its constant velocity movement. Thereafter, the amount of power supplied by the expander piston to the pumping piston will gradually decrease during the final part of both strokes, matching well with the deceleration phase of the pumping piston. During the dwell period which is desired for the pumping piston, so that this piston will be at rest at the instant that the valves are respectively opened and closed, the expander piston (and the interconnected compressor piston) will accordingly be at rest at the end of their respective strokes.

As mentioned above, control of the timing of the opening and closing of the EVs and the control of the HDU, which carefully regulates the precise movement of the common rod or shaft of each assembly through the double-acting HCs, is a straightforward exercise that is effected by individual control units in the ECU. Although the overall preferred embodiment is described with the use of double-acting cylinders for the expander cylinders, compressor cylinders and the pumping cylinders, it should be understood that, if desired, the system could be essentially duplicated using single-acting cylinders because the principles of operation would remain unchanged. It is believed that greater efficiency at less capital cost is achieved through the employment of double-acting cylinders; however, those having ordinary skill in this art will understand the various tradeoffs for various applications that come into play when considering the use of single-acting or double-acting cylinders. In addition, in certain pumping operations, it may be desirable to use plungers or rams instead of a piston having a piston rod of considerably lesser diameter, for example, in pumping coal slurries, and in such instances, the direct-drive engines might likely also utilize single-acting pistons so as to better match the desired pumping operation.

For purposes of this application, the term piston or piston means should be understood to generically include such rams or plungers that might alternatively be used to positively displace liquids or gases in such pumping or compressing operations. Likewise, the term "pumping" should be understood to include compressing gases or vapors and as such would have use in refrigeration applications.

While the invention herein disclosed has been described by means of specific embodiments and applications thereof, various modifications and variations may be made thereto by those skilled in the art without departing from the scope of the invention set forth in the claims. For example, although the invention can advantageously use renewable energy sources, such as solar and geothermal energy, such an engine system is not limited to these energy sources or to the particular applications hereinbefore enumerated. This concept may be applied for a variety of different applications and/or may utilize various suitable energy sources.

It should be noted that any number n of gas cylinder assemblies of the type shown in FIG. 8, along with their associated valves and controls, may be connected in parallel to produce the desired force and power output, which would then be similarly controlled by an HDU and applied to an FDU. It should also be understood that the present invention is not limited to the particular cylinder arrangement shown, but it can be practiced using a variety of different arrangements of series and parallel cylinder assemblies and piston assemblies. In addition, it should be understood that the thermal input from the heat source exchanger (HSE) can include reheat methods to introduce thermal energy between expander cylinders of multiple cylinder assemblies that may be operated in a series arrangement. Similarly, it should also be understood that thermal energy rejection from the cooler (CL) can include intercooling methods to remove thermal energy between the compressor cylinders of cylinder assemblies that are operated in a series arrangement. Such reheating and intercooling methods would be similar to that shown in Prior Art FIG. 4; however, they could be implemented with higher efficiency in this positive displacement arrangement. Further, it should be understood that the invention can be implemented open-loop and without utilizing intercooling, reheating, and recuperation utilizing the simple Brayton cycle commonly used for jet engines or gas turbines.

Figure 12:
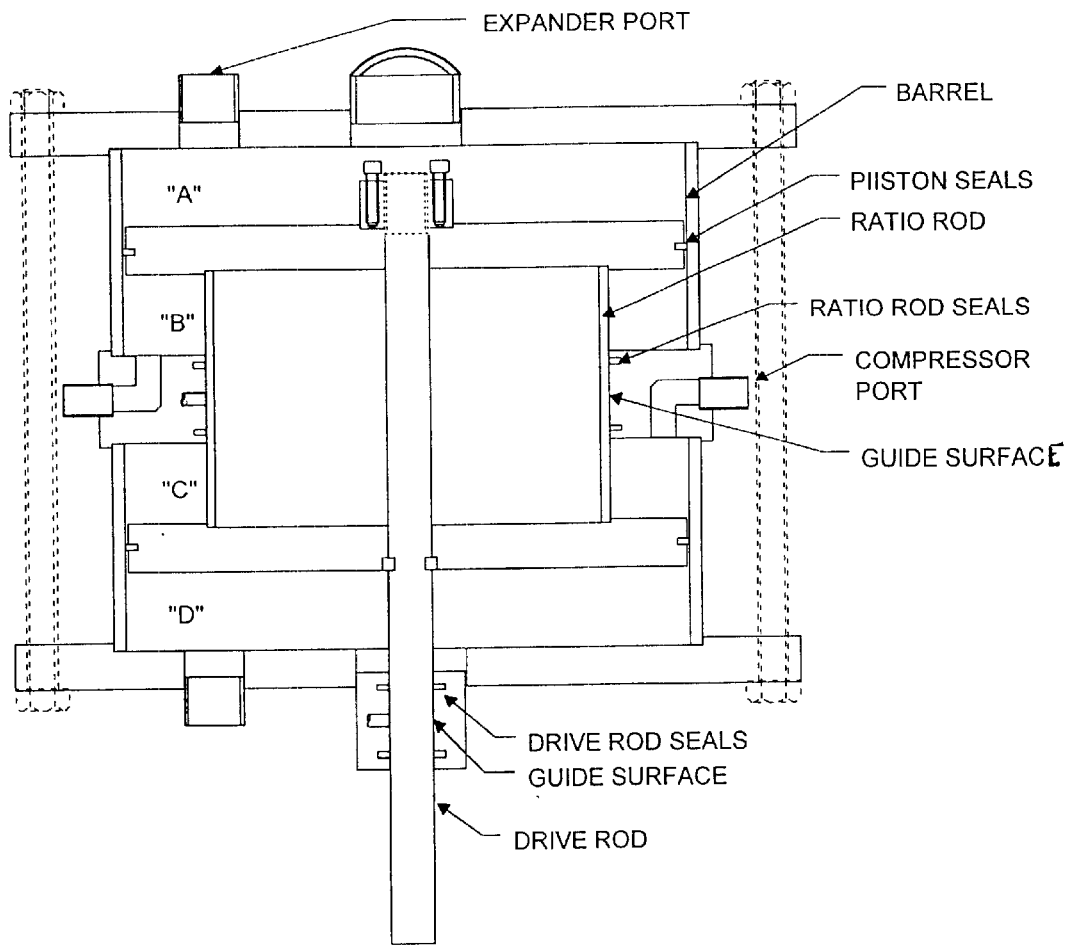
FIG. 12 shows an alternative gas cylinder arrangement wherein the compression chambers are concentric to the expansion chambers, rather than in-line.

FIG. 12 shows an alternative arrangement of an expander cylinder and a compressor cylinder to the longitudinally aligned arrangement depicted in FIG. 8. This alternative cylinder and piston arrangement is called a concentric cylinder arrangement. In this case, chambers "A" and "D" function as the working chambers of the expander cylinder, and annular chambers "B" and "C" function as the working chambers of the compressor cylinder. The function is the same as the in-line arrangement, except there are some benefits of saving overall length and also some piston sealing advantages. In this arrangement, the pressures equalize across the piston near mid-stroke, because the pressure in the higher pressure working volume of the expander cylinder is decreasing while the pressure is increasing in the working chamber of the compressor cylinder that is decreasing in size. In some applications, the FIG. 12 arrangement may be preferable to the inline arrangement shown in FIG. 8.

Furthermore, instead of employing the various pistons in a set in an in-line series configuration, piston sets might be arranged in a concentric configuration, or in a parallel configuration. An example of such a parallel configuration would be to have pistons of different sets connected to a reciprocating shaft by means of a crosshead or other equivalent mechanical force transfer arrangement, in which instance a pair of smaller diameter pistons might be used for mechanical balance.

As explained above, the control function carried out by the HDU is preferably accomplished using a double-acting cylinder because there is a desire to either add power to or subtract power from the power output that is being supplied to the pumping pistons from the expander pistons. However, those having skill in this art will understand that this function that can be duplicated by the employment of a pair of single-acting pistons which can be employed and controlled to operate in equivalent fashion.

Furthermore, because of its capability to add power or subtract power, the HDU can be suitably configured to combine with the HEU and the GDU to produce rotary output power in place of the linear power to drive the FDU. In this variation, the electric motor (M/G) of FIG. 8 could be substituted with an electric generator, and the rods from the hydraulic cylinders (HC1, HC2, and HC3) disconnected from the rods of the FDU. In this case, the reciprocating power from the GDU would provide power via the hydraulic cylinders to the hydraulic pumps (HP1, HP2, and HP3) to impart rotary power to the generator. In this case, the hydraulic pumps are functioning as hydraulic motors. It follows then that this power could also be used for other rotary power applications instead of turning a generator shaft.

The theoretical and design analysis that has been prepared for the arrangement shown in FIG. 8 indicates that this engine method can achieve extraordinarily high efficiencies at lower temperatures than those required by present day heat engines. A pilot version of such a controlled direct drive engine system demonstrates the feasibility of such direct drive systems. The system is of course capable of operating with extraordinarily low emissions because it can readily use cleaner burning continuous combustion, instead of the intermittent explosive combustion common to conventional internal combustion engines that operate on the Diesel or Otto thermodynamic cycles. Furthermore, the system is of course capable of operating with extraordinarily low emissions because it can readily utilize renewable energy resources such as solar or geothermal energy.

Particular features of the invention are emphasized in the claims which follow.

What is claimed is:

1. A power producing system particularly suited for positive displacement fluid pumping, which system comprises:

first means for producing reciprocating power from a thermal energy source which may include combustion energy, positive displacement fluid-displacement means including piston means for pumping/compressing fluid in a cylinder, which piston means is driven by said first means, and a hydraulic drive unit mechanically connected to said piston means for controlling said reciprocating power from said first means to achieve efficient operation by moving said piston means with a desired velocity profile.

2. The system of claim 1 wherein said first means includes:
   means for compressing a working fluid;
   means for heating said compressed fluid; and
   first cylinder means for expanding said heated compressed fluid to produce said reciprocating power.

3. The system of claim 2 wherein said compressing means includes second cylinder means mechanically interconnected with and driven by said first cylinder means.

4. The system of claim 3 wherein there are a plurality of subcombinations of said first and second cylinder means, with said subcombinations producing complementary reciprocating power outputs,
   wherein said fluid-displacement means includes a plurality of said piston means, and
   wherein said hydraulic drive unit transfers power between said plurality of reciprocating power outputs and between said plurality of piston means so as to achieve efficient operation of said fluid-displacement means.

5. The system of claim 4 wherein said hydraulic drive unit includes a plurality of rotary hydraulic power means which can function as a pump or a motor.

6. The system of claim 5 wherein said plurality of rotary hydraulic power means are mechanically interconnected so as to all rotate at the same speed and so as to transfer power back and forth therebetween.

7. The system of claim 2 wherein said first means includes a modified Brayton cycle engine which delivers reciprocating power, wherein said piston means operates in a double-acting cylinder and is linked by a common rod to said first cylinder means, wherein said hydraulic drive unit includes a double-acting cylinder which is also mechanically linked as part of said common rod, and wherein a control unit is included which controls said engine, said fluid-displacement means and said hydraulic drive unit to efficiently drive said double-acting cylinders of said fluid-displacement unit so as to move fluid on both forward and rearward strokes by adding power to or subtracting power from the stroke of said common rod to achieve said desired velocity profile of said piston means.

8. The system of claim 2 wherein said first cylinder means is a double-acting cylinder;
   wherein said compressing means includes a second double-acting cylinder linked to said first cylinder means;
   wherein said fluid-displacement means includes a double-acting cylinder wherein said piston means resides; and
   wherein said hydraulic drive unit includes a double-acting cylinder mechanically linked to said piston means and to said first cylinder means by a common rod and a rotary variable volume hydraulic motor/pump for controlling said output power from said first cylinder means to obtain said desired velocity profile and achieve efficient pumping operation.

9. The system of claim 8 wherein there are a plurality of said first cylinder means producing reciprocating power output and a plurality of fluid-displacement cylinders;
   wherein there is control means for operating said plurality of first cylinder means in complementary relationship,
   wherein said hydraulic drive unit includes a plurality of combinations of one said double-acting cylinder and one said rotary motor/pump, and means interconnecting said rotary motor/pumps so that all rotate at the same speed and so that power can be transferred therebetween, and
   wherein said control means transfers power between said plurality of reciprocating power outputs so as to achieve efficient pumping operation of said plurality of fluid-displacement cylinders.

10. The system of claim 9 wherein said hydraulic drive unit includes a rotary shaft which interconnects said plurality of motor/pumps and wherein an electric motor/generator is connected to said rotary shaft.

11. A combination of a modified Brayton cycle engine for delivering reciprocating power output, a fluid-displacement unit, a hydraulic drive unit which includes a double-acting cylinder, and a control unit, wherein a common rod unites said power output, said hydraulic drive unit cylinder and said fluid-displacement unit, said control unit being designed to operate said hydraulic drive unit to add power to or subtract power from said common rod to achieve a desired velocity profile for said fluid displacement unit that assures efficient and smooth operation.

12. The combination of claim 11 wherein said engine includes double-acting expander cylinders and said fluid-displacement unit includes cylinders which move fluid on both forward and rearward strokes.

13. The combination of claim 12 wherein said engine produces a plurality of reciprocating power outputs which are controlled through said control unit to complement one another, wherein said fluid-displacement unit includes a plurality of double-acting cylinders that move said fluid on both forward and rearward strokes that are respectively connected via said common rods to one of said power outputs and wherein said hydraulic drive unit transfers power among said common rods to efficiently utilize said plurality of power outputs.

14. A power producing system which comprises:
   a plurality of first means for producing reciprocating power through a rod from a thermal energy source which may include combustion energy,
   a plurality of linear hydraulic units, one of which is mechanically connected to each said rod,
   a plurality of rotary hydraulic power units which can function as a rotary pump or a motor, one of which units is associated with each said linear hydraulic unit,
   means interconnecting said rotary motor/pumps so that all rotate at the same speed and so that power can be transferred therebetween, and
   a control unit which operates said plurality of first power-producing means complementary to one another and controls the operation said hydraulic rotary power units so as to add power to or subtract power from said individual linear units and in this manner controls said plurality of first reciprocating power-producing means.

15. The system according to claim 14 wherein said interconnecting means is a common rotary shaft to which electrical generating means is also connected.

16. A method for positive-displacement fluid pumping employing a reciprocating thermal engine, which method comprises the steps of:
   providing a high temperature, high pressure fluid and expanding said fluid to produce reciprocating power output;
   transferring said power from said expanding step to carry out positive-displacement pumping/compressing and
   adjusting said output power through the use of a hydraulic drive unit to independently add to or subtract from said power output to achieve a desired velocity profile for said pumping/compressing to effect efficient operation.

17. The method of claim 16 wherein said adjusting step includes linking a piston of a hydraulic cylinder with said reciprocating power output and employing a rotary variable volume hydraulic motor/pump for said transferring by assisting or deterring movement of the piston and thereby controlling said pumping/compressing operation.

18. The method of claim 16 wherein a plurality of separate expansions of high-temperature fluid are carried out to produce a plurality of reciprocating power outputs, wherein said plurality of expansions are controlled to produce said power outputs in complementary relationship, wherein each of said plurality of power outputs is transferred to individually carry out said pumping/compressing, and wherein said adjusting step uses said hydraulic drive unit to also transfer power between said plurality of reciprocating power outputs and thereby achieve efficient pumping/compressing.

19. A power producing system particularly suited for providing rotary power output, which system comprises:

first means for producing reciprocating power from a thermal energy source, which may include combustion energy, which includes piston means, a hydraulic drive unit mechanically connected to said piston means for controlling said power from said first means to achieve efficient operation by moving said piston means with a desired velocity profile;

wherein said hydraulic drive unit includes a double-acting cylinder mechanically linked to said first cylinder means by a common rod and to a rotary variable volume hydraulic pump/motor;

a rotary output shaft from said hydraulic drive unit to achieve efficient rotary power output.

20. The system of claim 19 wherein said first reciprocating power-producing means includes:

means for compressing a working fluid;

means for heating said compressed fluid;

first cylinder means for expanding said heated compressed fluid to produce said reciprocating power, and second cylinder means mechanically interconnected with and driven by said first cylinder means.

\* \* \* \* \*